United States Patent [19]

Kawasaki

[11] Patent Number: 4,847,735
[45] Date of Patent: Jul. 11, 1989

[54] FITTING STRUCTURE OF SAFETY LAMP TO WHEEL

[76] Inventor: Masaki Kawasaki, 171-3, Oaza Nishiiribe, Sawara-ku, Fukuoka-shi, Japan

[21] Appl. No.: 186,256

[22] Filed: Apr. 26, 1988

[30] Foreign Application Priority Data

Apr. 30, 1987 [JP] Japan .............................. 62-66566[U]
Nov. 4, 1987 [JP] Japan ............................ 62-169444[U]

[51] Int. Cl.$^4$ ........................ F21V 33/00; F21K 2/00; B62J 6/00
[52] U.S. Cl. ..................................... 362/72; 362/34; 362/78; 362/84; 362/191; 340/432
[58] Field of Search ....................... 362/34, 72, 78, 84, 362/96, 190, 191, 253, 806; 340/134; 152/428, 431; 138/89.1, 89.2, 89.3, 89.4; 137/232, 233

[56] References Cited

U.S. PATENT DOCUMENTS

| 1,133,042 | 3/1915 | Kull | 137/232 |
| 2,178,828 | 11/1939 | Broecker | 137/233 |
| 2,382,832 | 8/1945 | Thornton | 138/89.4 |
| 2,981,827 | 4/1961 | Orsatti et al. | 362/84 |
| 3,987,409 | 10/1976 | Freeman | 362/72 |
| 4,176,390 | 11/1979 | Galbert | 362/72 |
| 4,800,469 | 1/1989 | Leon | 362/72 |

FOREIGN PATENT DOCUMENTS 1068313 12/1952 France ................................. 362/72

Primary Examiner—Ira S. Lazarus
Assistant Examiner—David G. Messer
Attorney, Agent, or Firm—Jordan and Hamburg

[57] ABSTRACT

The present invention discloses a fitting structure of a safety lamp to a wheel especially of a bicycle or motorcycle. Such safety lamp is replaceably mounted on an air valve disposed on the wheel. Due to such construction, people can clearly recognize the presence of the bicycle or motorcycle even from the back or the side, thus enhancing the safety of the rider. Furthermore, the safety lamp can be fitted easily and reliably by utilizing the male screw portion of the air valve of the wheel. The fitting structure includes a skirt which protects the air valve.

9 Claims, 2 Drawing Sheets

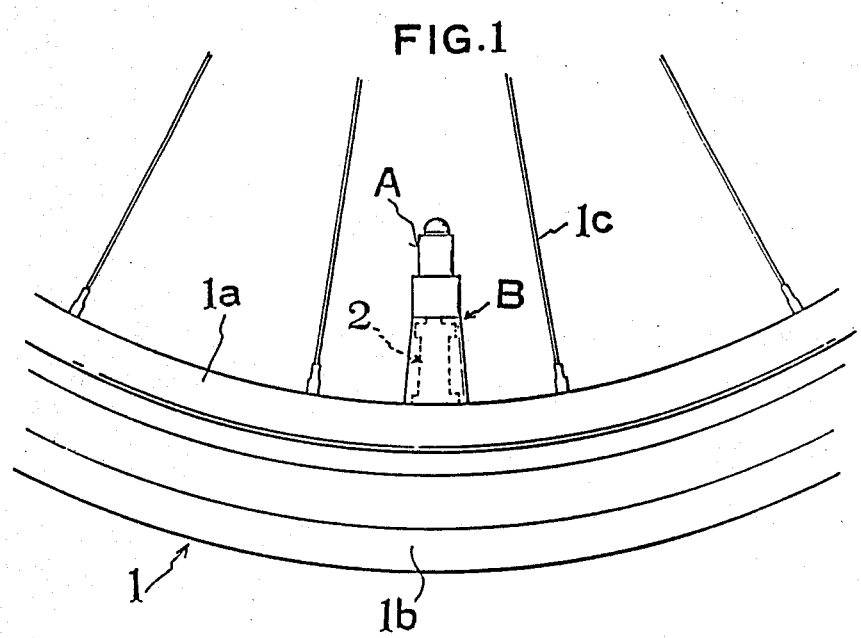
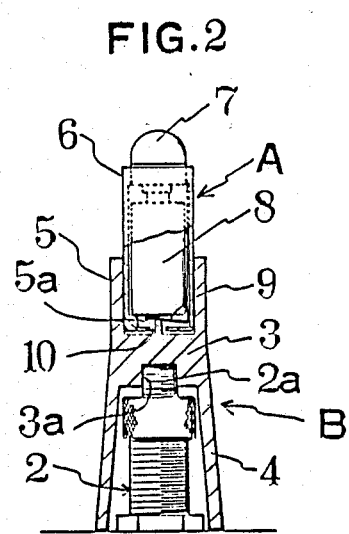
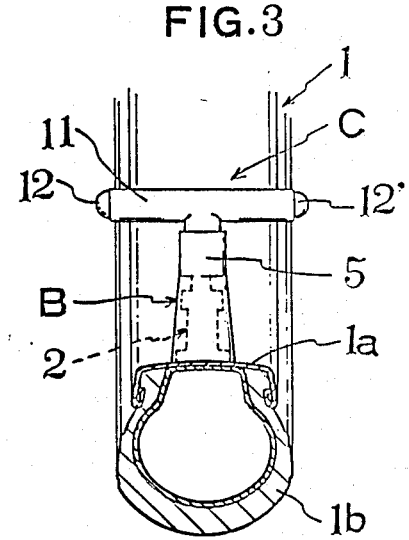

FITTING STRUCTURE OF SAFETY LAMP TO WHEEL

BACKGROUND OF THE INVENTION

The present invention relates to a fitting structure of a safety lamp such as a fluorescent light emitting member to a wheel.

Conventionally, a lamp is fitted to a frame body of a bicycle and a motorcycle for cycling in the night and a reflection plate is fitted to the front or rear end of the frame body so that the presence of the bicycle or motorcycle can be recognized easily by, for example, an oncoming car at night.

However, the lamp illuminates only forwardly for safe cycling or driving while the reflection plate merely reflects the rays of light projected from outside but does not emit the rays of light by itself.

Therefore, it is not easy from time to time to confirm the presence of the bicycle or motorcycle running in the night from the back or side thereof and the safety of the rider is not sufficiently achieved.

Accordingly, it is an object of the present invention to provide a safety lamp which can enable people to clearly recognize the presence of the bicycle or motorcycle even from the back or the side, thus enhancing the safety of the rider.

In summary, the present invention discloses a fitting structure of a safety lamp to a wheel characterized in that the safety lamp such as a fluorescent light emitting member is replaceably attached to an air valve disposed on a wheel.

BRIEF DESCRIPTION OF DRAWINGS

FIG. 1 is a side view of a wheel having a fitting structure of safety lamp to a wheel of the present invention.

FIG. 2 is an enlarged sectional view of the principal portions of the fitting structure.

FIG. 3 shows a modifications of above fitting structure.

DETAILED DESCRIPTION OF PREFERRED EMBODIMENTS OF THE INVENTION

Figure 4:
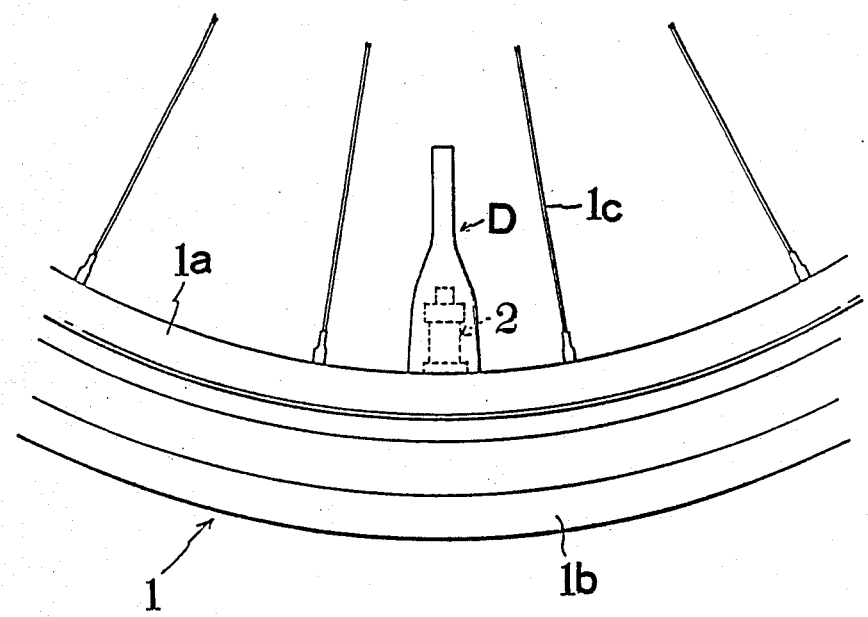
FIG. 4 is a side view of a wheel having a fitting structure of safety lamp of another embodiment of the present invention.

Referring to FIGS. 1 and 2, symbol (A) represents a safety lamp, symbol (B) represents a safety lamp fitting device, and reference numeral (1) represents a wheel of a bicycle. Reference numeral (1a) represents the rim of the wheel (1), (1b) is a tire, (1c) is a spoke, (2) is an air valve implanted to the rim (1a) and (2a) is a male screw portion disposed at the tip of the valve (2).

The safety lamp fitting device (B) comprises a fitting body (3) which is provided with a safety lamp mounting recess (5) and a skirt portion (4). Such fitting body (3) and the skirt portion (4) are made integrally from a synthetic resin having elasticity.

At the bottom of the fitting body (3), a female-threaded recess (3a) is formed for meshing with a male-threaded screw portion (2a) of the air valve (2).

The skirt portion (4) gradually increases in diameter toward the rim (1a) of the wheel to provide a space for accomodating the air valve (2) and the male-threaded portion (2a) of the air valve (2) is threaded into the female-threaded portion (3a) of the fitting body (3) while the rim-side end of the skirt portion (4) comes into contact with the inner surface of the rim (1a) by the above meshing of two elements to entirely and watertightly cover the air valve (2).

The lamp mounting recess (5) of the fitting body (3) is constructed such that the proximal end of a safety lamp body (6) can be snugly received by the lamp mounting recess (5) due to the elasticity or resiliency of the fitting body (3).

At the bottom of the lamp mounting recess (5), a protrusion (5a) is formed for switching the safety lamp (A).

The safety lamp fitting device (B) may be provided with a coating of fluorescent material on the outer surface thereof.

The safety lamp (A) is provided with a light emitting member (7) such as an electric bulb or a light emitting diode. Such light emitting member (7), a power source (8) such as a battery cell and a switch (9) which is mounted on the inner bottom portion of the safety lamp body (6) are all electrically connected and a protrusion inserting opening (10) is formed in the bottom of the safety light body (6) to enable the inserting of the protrusion (5a).

Accordingly, the safety lamp fitting device (B) can be readily attached to the rim (1a) of the wheel (1) by engaging the female-threaded portion (3a) of the fitting body (3) with the male-threaded portion (2a) of the air valve (2). The safety lamp fitting device (B) also can be readily removed from the rim (1a) of the wheel (1) by disengaging the female-threaded portion (3a) of the fitting body (3) from the male-threaded portion (2a) of the air valve (2).

After mounting the safety lamp fitting device (B) on the rim (1a) of the wheel (1), the safety lamp (A) can be readily attached to the safety lamp fitting device (B) by merely inserting the proximal end of the safety lamp (A) into the safety lamp mounting recess against the resiliency of the safety lamp mounting portion (5).

When the safety lamp (A) has been attached to the safety lamp fitting device (B), the switching protrusion (5a) protrudes through the opening (10) to electrically connect the switch (9) of the safety lamp (A) and the light emitting member (7) of the safety lamp (A) emits a light.

The safety lamp (A) can be readily removed from the safety lamp mounting portion (5) whereupon the the switch (9) is severed and the emission of the light is terminated.

In FIG. 3, a modification of the above embodiment is shown including a T-shaped safety lamp (C) and such safety lamp (C) comprises a T-shpaed safety lamp body (11) and a pair of light-emitting portions (12), (12') and a central strut portion of the safety lamp body (11) is snugly fit into the safety lamp mounting portion (5) of the safety lamp mounting device (B).

The T-shaped safety lamp (C) is also provided with an inner construction similar to the inner construction of the aforementioned safety lamp (A) and when the safety lamp (C) is snugly fit into the safety lamp mounting portion (5), the light-emitting portions (12), (12') emit light, while when the safety lamp (C) is disengaged from the safety lamp mounting portion (5), the emission of the light from the light-emitting portions (12), (12') ceases.

In the above embodiment, the safety lamp (A) and the safety lamp fitting device (B) can be constructed as an integral element and such integral element can be attached to the air valve (2).

A fluorescent body which can emit light without a battery cell can be accomodated into the safety lamp mounting portion (5).

In this embodiment, the wheel (1) is not restricted to the wheel of a bicycle or a motorcycle but includes a wheel of an automobile.

Figure 5:
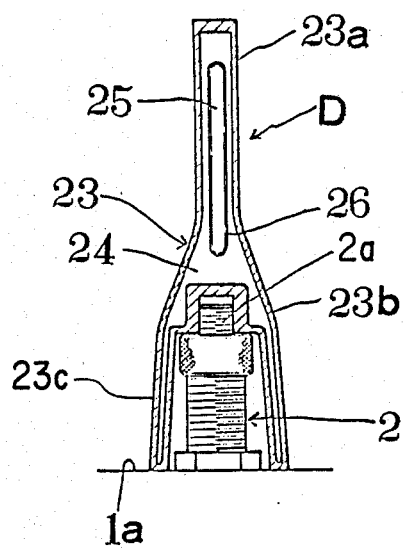
FIG. 5 is an enlarged sectional view of the principal portions of the fitting structure.
Figure 6:
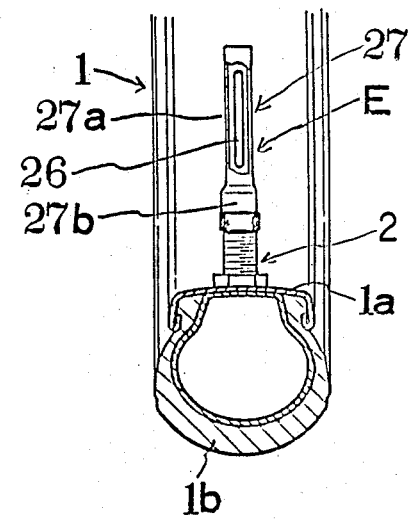
FIG. 6 shows a modification of the above fitting structure.

In FIG. 4 to FIG. 6, another embodiment of the present invention is disclosed and such embodiment is characterized in that a fluorescent light emitting member (D) instead of the battery-cell activated safety lamp (B) is mounted on the rim (1a) of the wheel (1).

The fluorescent light emitting member (D) comprises an oxidizing liquid (24) and a fluorescent light liquid (25) contained in a storage case (23) made of a synthetic resin, the fluorescent light liquid (25) being further contained in a capsule (26) and thereby being separated from the oxidizing liquid (24).

The storage case (23) consists of a thinly elongated, cylindrical capsule storage portion (23a) and a skirt-like fitting portion (23c) which covers the air valve (2) as a whole and has a female screw portion(23b) capable of meshing with the male screw portion (2a) of the air valve (2). The exterior walls of the case (23) are transparent so as to improve transmissivity.

The capsule storage portion (23a) is slightly bendable when its intermediate part is pushed.

The capsule (26) is made of a synthetic resin or the like, has a thinly elongated shape so that it can be stored in the capsule storage portion (23a) and is thin so that it can be broken easily when the capsule storage portion (23a) is bent, whereupon the fluorescent liquid (25) stored therein causes a chemical light emitting reaction with the oxidizing liquid (24) inside the capsule storage portion (23a).

Hydrogen peroxide or the like is used as the oxidizing liquid (24) while a mixture of an oxalate and a fluorescent material is used as the fluorescent liquid (25).

The chemical reaction between the oxidizing liquid (24) and the fluorescent liquid (25) causes chemical light emission and the rays of light are emitted outside through the storage case (23). The color of light emission can be changed in many ways by changing the fluorescent material. FIG. 6 shows a fluorescent light emitting member (E) as a modification of this embodiment. The storage case (27) in this embodiment consists of a capsule storage portion (27a) and a female screw portion (27b) capable of meshing with the male screw portion (2a) of the air valve (2). In each of the fluorescent light emitting members (D) and (E) described above, the capsule (26) inside the storage case (23), (27) is broken when the case (23), (27) is bent and the chemical light emitting reaction occurs between the fluorescent liquid (25) and the oxidizing liquid (24) and thereby causes light emission. Each light emitting member (D), (E) can be fitted easily and reliably to the wheel (1) by meshing the female screw portion (23b), (27b) of each light emitting member (D), (E) with the male screw portion (2a) of the air valve (2).

When one rides the bicycle in the night, for example, he fits the fluorescent light emitting member (D) to the male screw portion (2a) of the air valve (2) of the wheel (1) of the bicycle and runs the bicycle while the light emitting member (D) is emitting light.

In this case, the light source of the fluorescent light emitting member (D) moves while describing a trochoidal curve with the rotation of the wheel so that the bicycle can be recognized reliably even in the dark and collision between the bicycle and a car can be prevented.

In accordance with this embodiment, the the fluorescent light emitting member (D) can be fitted easily and reliably by utilizing the air valve (2) of the wheel (1) having the male screw portion (2a). Therefore, one does not feel it is any trouble to fit the fluorescent light emitting member (D) before he rides the bicycle in the night and safe cycling can therefore be insured.

Moreover, since the fluorescent light emitting member (D) is fitted to the wheel (1), the light moves so that the bicycle can be well recognized from outside and the safety effect can be further improved.

What we claim is :

1. A safety lamp assembly adapted to be mounted on an air valve of a pneumatic tire on a wheel rim of a vehicle, the air valve having a male threaded stem, the assembly comprising an elongated hollow air valve mounting body having an open end, the body having a flaring skirt portion contiguous with the open end and within the skirt portion a hollow for receiving the valve stem through the opening, the hollow having a closed end spaced from the opening, a female threaded cavity formed in the closed end of the hollow for mating with the male threaded stem when the stem is received in the hollow, the skirt portion forming a rim around the opening and the distance from the rim of the skirt portion to the female threaded cavity measured axially of the body relative to the length of the stem being so selected that the rim of the skirt portion sealingly engages the wheel rim when the body is screwed down onto the stem to mate the female threaded cavity with the male threads on the stem thereby to seal off the valve from the ambient, a recess formed in the other end of the body and a light source received in the recess.

2. A safety lamp assembly according to claim 1, in which the body is made of a resilient synthetic resin.

3. A safety lamp assembly according to claim 2, in which the light source comprises a lamp body and, supported by the lamp body, electrically powered light emitting means and a battery cell in electrical contact with said light emitting means for providing electrical power thereto, the battery cell being contained in a housing received in the recess by means of a press fit and the housing being formed in a portion of the lamp body proximal relative to the recess and the lamp body having an end distal relative to the recess, the light emitting means being mounted on said distal end.

4. A safety lamp assembly according to claim 3, in which the housing has an end proximal relative to the recess and an opening is formed in said proximal end and the assembly further comprises an electrically conductive protrusion situated in the recess and projecting through the opening into electrical contact with the battery cell, the electrical contact of the protrusion with battery cell completing an electrical circuit including the battery cell and the light emitting means, whereby upon insertion of the housing into the recess the protrusion functions as means for switching on the light emitting means.

5. A safety lamp assembly according to claim 3, in which the lamp body is T-shaped, the "T" having a leg and two arms, the housing being formed in the leg, an end of one of the arms being said distal end and having said light emitting means mounted thereat, an end of the other of the arms being a second distal end and having a second light emitting means mounted thereat, the arms being parallel to the axis of the wheel rim when the assembly is mounted on the valve stem.

6. A safety lamp assembly according to claim 5, in which the housing has an end proximal relative to the recess and an opening is formed in said proximal end and the assembly further comprises an electrically conductive protrusion situated in the recess and projecting through the opening into electrical contact with the battery cell, the electrical contact of the protrusion with battery cell completing an electrical circuit including the battery cell and the light emitting means, whereby upon insertion of the housing into the recess the protrusion functions as means for switching on the light emitting means.

7. A safety lamp assembly adapted to be mounted on the air valve of a pneumatic tire on a wheel rim of a vehicle, the air valve having a male threaded stem, the assembly comprising an elongated hollow air valve mounting body having an open end, the body having a flaring skirt portion contiguous with the open end and within the skirt portion a hollow for receiving the valve stem through the opening, the hollow having a closed end spaced from the opening, a female threaded cavity formed in the closed end of the hollow for mating with the male threaded stem when the stem is received in the hollow, the skirt portion forming a rim around the opening, a closed chamber formed in the body in a portion thereof contiguous with the end of the body opposite the open end, the chamber being formed of walls of the body made of a light permeable, resilient, synthetic resin and the walls being distortable by hand, a first liquid contained in the chamber, mounted in the chamber a thin walled, easily breakable capsule containing a second liquid, the two liquids being so selected that they undergo a fluorescent light emitting reaction when brought into contact with each other, the capsule being so located relative to said hand distortable walls that hand distortion of said walls reptures the capsule whereupon the liquids mix and fluorescent light is a emitted.

8. A safety lamp assembly according to claim 7, in which the distance from the rim of the skirt portion to the female threaded cavity measured axially of the body relative to the length of the stem is so selected that the rim of the skirt portion sealingly engages the wheel rim when the body is screwed down onto the stem to mate the female threaded cavity with the male threads on the stem thereby to seal off the valve from the ambient.

9. A safety lamp assembly adapted to be mounted on an air valve of a pneumatic tire on a wheel rim of a vehicle, the air valve having a male threaded stem, the assembly comprising an elongated hollow air valve mounting body having two ends and a female threaded cavity formed in one end thereof for mating with the male threaded stem thereby to mount the body on the stem, a closed chamber formed in the body in a portion thereof contiguous with the other end of the body, the chamber being formed of walls of the body made of a light permeable, resilient, synthetic resin and the walls being distortable by hand, a first liquid contained in the chamber, and mounted in the chamber a thin walled, easily breakable capsule containing a second liquid, the two liquids being so selected that they undergo a fluorescent light emitting reaction when brought into contact with each other, the capsule being so located relative to said hand distortable walls that hand distortion of said walls ruptures the capsule whereupon the liquids mix and fluorescent light is a emitted.

* * * * *